Oct. 2, 1951     A. A. LOCKE     2,569,820
HOT BEVERAGE MAKER
Filed June 21, 1946     3 Sheets-Sheet 1
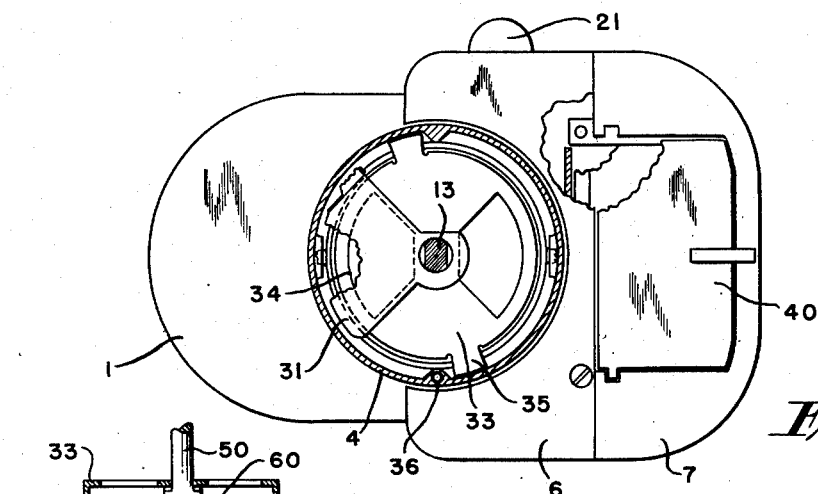
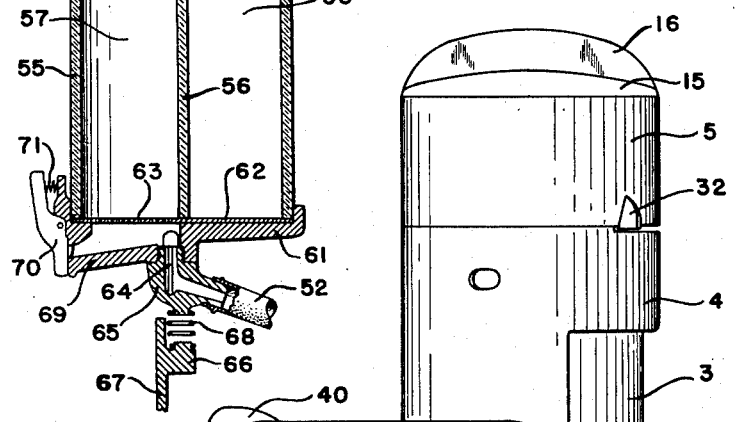
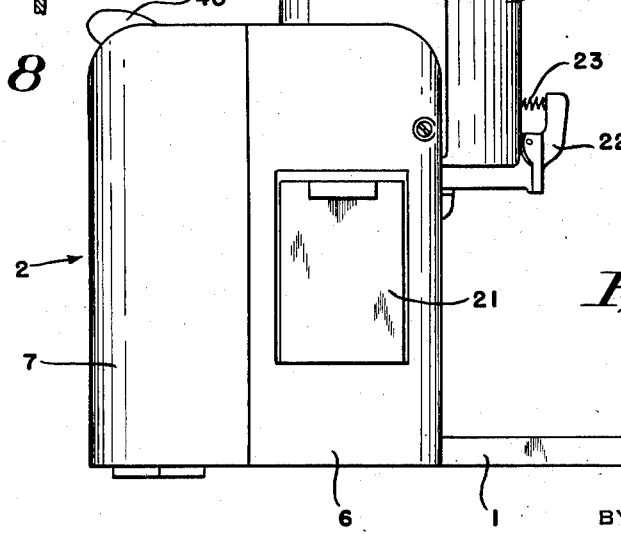
INVENTOR
ARTHUR A. LOCKE
BY
ATTORNEY Oct. 2, 1951     A. A. LOCKE     2,569,820
HOT BEVERAGE MAKER Filed June 21, 1946     3 Sheets-Sheet 2

INVENTOR
ARTHUR A. LOCKE
BY
ATTORNEY

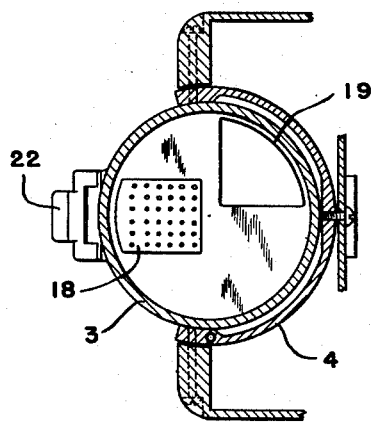
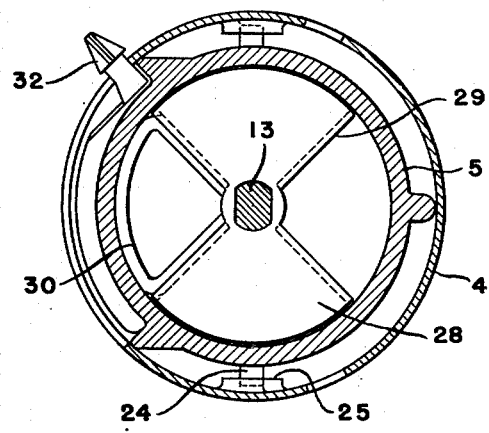
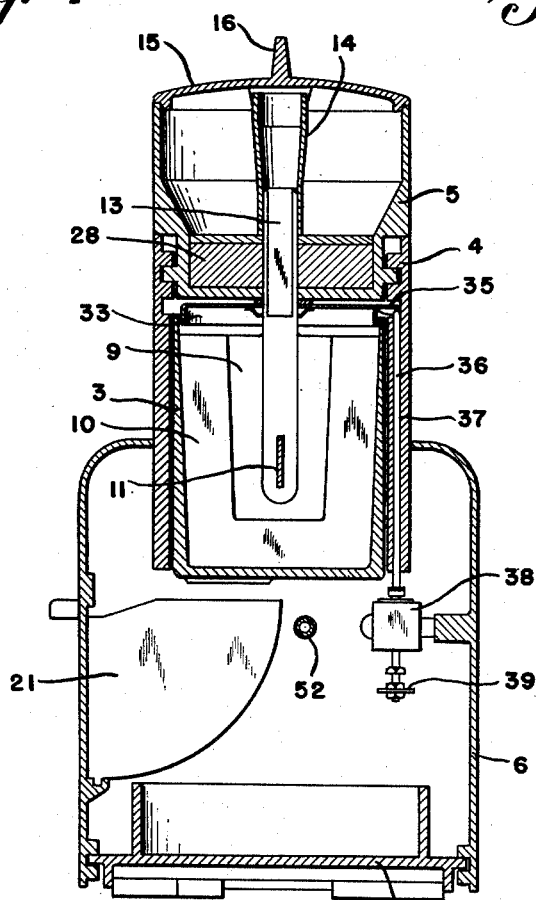

Patented Oct. 2, 1951

2,569,820

UNITED STATES PATENT OFFICE 2,569,820

HOT BEVERAGE MAKER

Arthur A. Locke, Detroit, Mich.

Application June 21, 1946, Serial No. 678,332

8 Claims. (Cl. 99—281)

This invention relates to an apparatus for making hot beverages and, in particular, it relates to a device or dispenser which functions in a semi-automatic manner to produce a hot beverage, such as a cup of coffee.

In general, my invention comprises a mixing chamber, means for automatically introducing a predetermined quantity of coffee, or similar basic ingredient, into the mixing chamber in combination with means for receiving a measured quantity of water, for heating the water to boiling temperature and thereafter forcing the water into the mixing chamber which contains the coffee. The mixing chamber is provided with means for removing the coffee grounds from the chamber so that the chamber will immediately be in a position to receive and prepare a subsequent cup of coffee or other hot beverages.

While a device of this kind has for its purpose to make various types of hot beverages, such as coffee, chocolate, synthetic coffees, and other drinks which combine hot water and solid ingredients, it is described hereinafter as a device to make a coffee drink, and it is to be understood that reference to coffee is intended to include such other materials for making various other types of hot beverages.

Most conventional methods of making coffee include a container in which a measured quantity of coffee is placed and also a measured quantity of water which is placed either in the same container or in an associated container such as in a percolator type of coffee maker. The present invention is intended to make a single cup of coffee at a time or, if desired, one or more cups of coffee may be made at the same time. One of the objects of the present invention is to combine with the device a hopper into which a large quantity of ground coffee may be placed. This coffee is fed from the hopper into a measuring wheel which selects the proper amount of ground coffee and allows it to drop into the mixing container. This is accomplished by a turning movement of the upper portion of the coffee making device. This turning movement besides positioning the measured quantity of ground coffee, also wipes the walls of the container free from any grounds, which may previously remain in the mixing chamber. The coffee grounds so removed are dropped into a receptacle from which they may be perodically removed. The turning movement of the upper portion of the coffee device also sets into operation an electrical switch which energizes a heating unit for heating a measured quantity of water. When the water is heated to a proper temperature a thermostat control functions to operate an electrical switch for cutting off the source of electrical energy. Thus, it is merely necessary to place into the device a measured quantity of water and to turn the upper portion of the device a one-half revolution. Thereafter, the mechanism operates automatically to provide in the mixing compartment a full cup of prepared hot coffee. A hand valve at the bottom of the mixing compartment allows the prepared hot coffee to drain into a cup positioned to receive the coffee. By providing a device which functions to prepare a single cup of coffee, and by utilizing an immersion type electric heater, it is possible to heat such a small quantity of water with great rapidity thus enabling the production of a prepared cup of coffee in a relatively short cycle of operation.

It is therefore among the objects of my invention to provide a dispensing device in which a cup of hot coffee may be prepared expeditiously; to provide such a device in which a quantity of ground coffee is automatically measured and deposited in a mixing chamber; to provide such a device in which deposited materials, such as coffee grounds, are automatically removed from the container before a similar cycle of operation takes place; to provide such a device in which automatic means are provided to energize an electrical heating element and to disengage the source of electrical energy upon a predetermined temperature rise; and, to provide such a device which will operate expeditiously and which may be manufactured economically.

These and other objects and advantages will appear more fully in the following detailed description when considered in connection with the accompanying drawings, in which Figure 1 is a side elevational view of a coffee dispenser illustrating an embodiment of my invention;

Figure 4 is a front elevational view, in section, taken along lines IV—IV of Figure 3;

Figure 5 is a transverse view, in section, taken along lines V—V of Figure 2;

Figure 6 is a plan view, in section, taken along lines VI—VI of Figure 2;

Figure 7 is a transverse view, in section, taken along lines VII—VII of Figure 2; and Figure 8 is a side elevational view, in section, of a portion of the device such as shown in Figure 2, except that it illustrates a modification of a mixing chamber.

Figure 3:
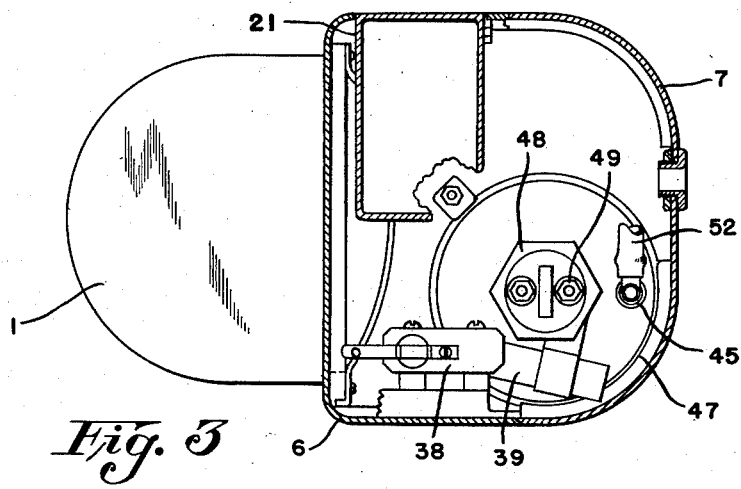
Figure 3 is a plan view of the device, in section, taken along lines III—III of Figure 2.
Figure 2:
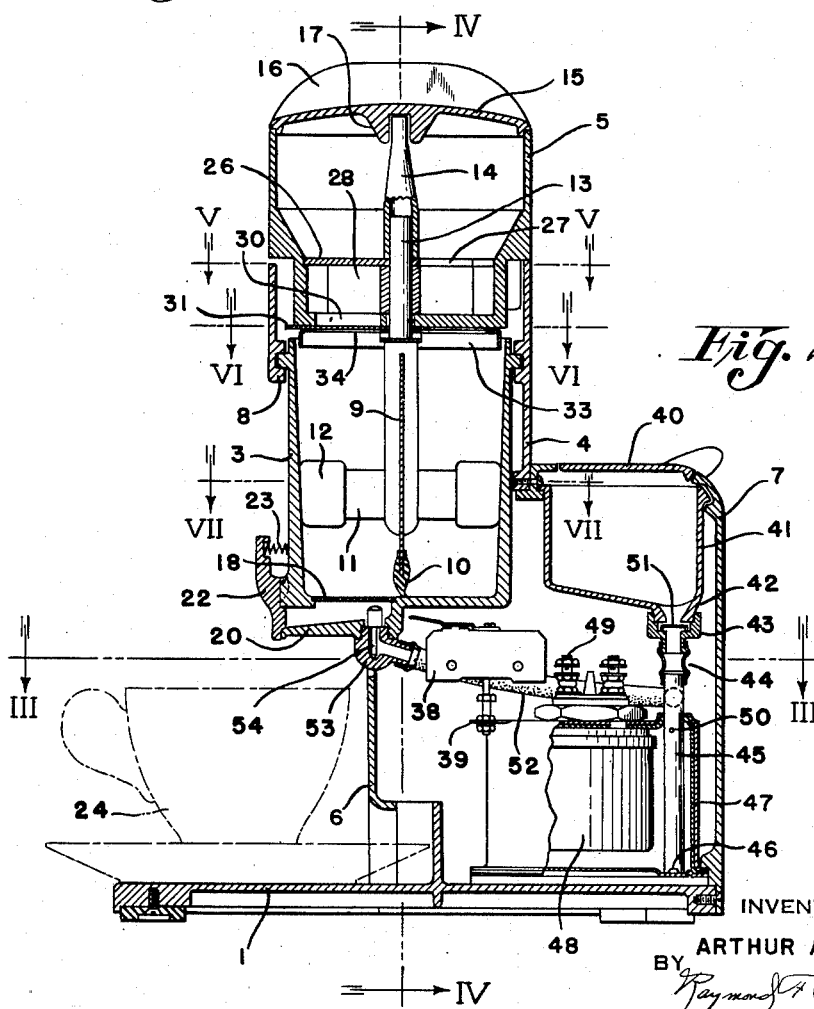
Figure 2 is a side elevational view of the device in section.

With reference to the drawing and in particular to Figures 1 and 2, I show an embodiment of my invention in the form of a coffee maker constituting essentially a base member 1, a housing 2, a mixing chamber 3, a mixing chamber cover 4, and a hopper 5. While it is understood that the parts for the present device may be made of various materials such as metal stampings, or by castings, the present embodiment is illustrated in the form of a material made of plastics such as thermo-setting resins.

The housing 2 includes the main housing member 6 which projects from the base 1 and a cover member 7 which is secured to the base. The mixing chamber cover 4 is supported by the main housing member 6. The mixing chamber 3 is supported by the mixing chamber cover 4 by a pair of inter-locking lugs 8 which are provided on opposite sides of the cover 4. Preferably, the mixing chamber 3 is formed of a transparent material which may be either glass or a transparent plastic.

Within the mixing chamber is a partition 9 which divides the mixing chamber into two separate compartments. This partition 9 is rotatable within the mixing chamber, and in order to confine the liquid on one side of the partition, the partition, along its side and bottom edges is provided with a sealing member 10 such as rubber, for the purpose of functioning as a gasket or sealing member adapted to press against the inner walls of the mixing chamber. Extending laterally from the partition 9 is a member 11 having rubber-tipped ends 12 also adapted to engage the inner walls of the mixing chamber 3. The purpose of the lateral member 11 is merely to function as a guide to maintain the partition 9 in a central position relative to the mixing member 3. Extending upwardly from the partition 9 is a flat surface shaft 13 adapted to engage with an extension shaft 14. A cover 15 for the hopper 5 is provided with a flat projecting portion 16 which, in turn, provides a gripping portion to enable manual rotation of the cover 15. Lugs 17 extend from the underside of the cover 15 and engage with a flat portion on the extension shaft 14. By this arrangement, a rotating movement of the cover 15 operates to rotate the partition 9.

At the bottom of the mixing chamber 3 is a perforated plate 18 (Figure 7) and also an opening 19. The perforated plate 18 functions as a screen to prevent coffee grinds from entering an outlet duct 20 which communicates with the interior of the chamber 3. Thus, as the partition 9 is rotated the rubber sealing member 10 along the edges of the partition 9 wipe against the inner walls and bottom of the chamber 3 to remove the coffee grinds from the one-half side of the divided mixing chamber to the opposite side. This occurs when the partition is rotated 180°. When such action takes place the coffee grinds are wiped from one side of the partition to the opposite side where they drop through the opening 19 in the bottom of the mixing chamber 3 and into a receptacle 21 (Figure 4). This receptacle is associated with the main housing member 6 and is easily removable therefrom as a separate unit for the purpose of cleaning same.

A hand operated valve 22 functions to close the drain aperture 20 leading to the bottom of the container 3. A spring 23 normally maintains the valve 22 in closed position. The entire housing and base is so arranged that a cup or cup and saucer unit 24 may be positioned on the base 1 in receptive position below the valve 22.

By manually engaging the projecting portion 16 of the cover 15 and rotating the cover 180°, the partition 9 is rotated so as to wipe coffee grinds from the mixing portion of the chamber 3. By the same turning movement a quantity of coffee is measured and placed in position to be dropped into the mixing compartment of the chamber 3. The hopper 5 is attached to the mixing chamber cover 4 by means of lugs 24 (Figure 5) extending from the hopper and engageable in a slot in a projecting portion 25 extending from the mixing chamber cover 4. This method of attachment is preferable to permit the hopper portion, as well as other associated parts, to be readily disassembled for purpose of cleaning. However, in the operation of the device the hopper 5 remains relatively in a fixed position with the mixing chamber cover 4 and the main housing member 6.

Positioned near the bottom of the hopper 5 is a disc 26 which serves as a partition plate. A cutout portion 27 in the disc 26 in V-shaped formation permits the coffee from within the hopper 3 to pass through the opening 27 in the plate 26 and into position with a measuring wheel 28 which serves to measure the desired quantity of coffee and move it into position above the mixing compartment of the chamber 3. This measuring wheel 28 (Figure 5) is provided with two V-shaped openings which are diametrically opposed. From the hopper side, the partition plate 26 prevents coffee from entering into the left hand opening 29 but allowing the right hand opening 29 to be always in direct communication with the hopper. This position is referred to in accordance with Figure 2. When the cover 15 is rotated 180° the measured quantity of coffee within the right hand opening 29 of the measuring wheel 28 is moved to its left hand position which is directly above the mixing compartment of the chamber 3. A further opening 30 also of V-shaped formation and located in the bottom wall of the hopper 5 provides a direct communication between the hopper 5 and the mixing compartment of the chamber 3. Since it is necessary to retain the quantity of coffee in the measuring wheel 28 until it is desired to drop the contents into the mixing compartment, a gate plate 31 (Figure 6) is positioned directly below the bottom opening 30 in the hopper 5. This gate plate is pivotally retained by the shaft 13 and is provided with a projecting handle 32 (Figure 5) for manual operation of the gate plate to drop the coffee into the mixing compartment. This gate plate is supported, in part, by the cam plate 33 located directly below the gate plate and provided with a flat sided central aperture for engagement and rotatable with the shaft 13. The cam shaft 33 is also provided with two diametrically opposed V-shaped openings 34 to permit the coffee to drop therethrough. The cam plate 33 is provided with diametrically opposed cams 35 extending outwardly from the cam plate (Figure 4). The purpose of the cams 35 is to actuate a vertically extending rod 36 loosely fitted in an aperture 37 in the wall of the chamber cover 4. The purpose of the cam actuating means is to cause engagement of an electrical switch, hereinafter described, upon each 180° turning movement of the cover 15.

As shown in Figures 2 and 4, a conventional electrical switch is supported from the housing member 6. This switch is of double acting type; that is, a downward movement of the rod 36 causes an electric contact to take place within the switch and such contact will continue until the switch is again disengaged by means of a bi-metal thermostat 39 which cuts off the switch when a predetermined temperature is reached from a boiler hereinafter described.

At the top of the cover member 7 is a lid 40 (Figure 2) pivotally attached to the cover and which may be lifted for the purpose of pouring therethrough a cup of water. Within the cover 7 is a funnel 41 for reception of the water. At the bottom of the funnel 41 is an opening 42 which communicates with a valve housing 43 and through a connecting sleeve 44 and to a feeder tube 45 from a side opening 46 at the bottom of the feeder tube 45, the water which is poured into the funnel 41 passes to a boiler 47. This boiler is essentially a closed container having the capacity of a single cup of water. Within the boiler is a conventional immersion type electrical heating element 48 having terminals 49 which engage through the switch 38 to a source of electrical energy. The bi-metal thermostat 39 is attached to the boiler 47 and cuts off the switch 38 when a predetermined boiler temperature is reached.

When the water within the boiler 47 reaches substantially the boiling temperature, the water within the boiler is forced outwardly therefrom through the only aperture 46 at the bottom of the feeder tube 45. In the early stages when arriving at the boiling temperature, a small aperture 50 at the upper end of the feeder tube 45 within the boiler relieves the pressure within the tube 45 until the pressure is sufficient to move all of the water within the boiler therefrom. When pressure is built up in the boiler a valve 51 within the valve housing 43 functions to close the opening 42 in the funnel 41 and prevent back movement of the water from the feeder tube.

Connecting with the upper portion of the feeder tube 45 outside of the boiler 47 is a tube 52 which communicates with the mixing compartment of the chamber 3. This tube 52 connects with a valve housing 53 attached to the base of the mixing compartment 3 and contains a valve 54 which operates to allow a one way movement only of fluid to within the mixing compartment.

In the operation of the device it is merely necessary to empty a cup of water, either hot or cold, into the funnel 41 and place the cup in receptive position, as shown in Figure 2. Thereafter, the cover 15 is turned 180° which measures a quantity of coffee and places it above the mixing compartment. A swinging movement of the manually operated gate arm 32 drops the coffee into the mixing compartment. When the cover 15 is turned the 180° movement the electrical heater 48 is energized by means of the cam 35 and electrical switch 38. When the water reaches the boiling point it automatically is forced out of the boiler 47 and up through the bottom of the mixing compartment of the chamber 3. Since the mixing chamber 3 is of transparent material the movement of the water into the chamber is visible. The electric switch 38 is automatically cut off by means of the thermostat 39 and, when desired, the valve 22 may be opened to permit the prepared coffee to pour into the cup which is in position to receive same. Thereafter, by again pouring a cup of water into the funnel 41 and turning the cover 180° the device will function in a similar cycle of operation.

Figure 8 illustrates a modification of the invention which is the same in function and construction as the principal embodiment hereinbefore described, with the exception of a different arrangement for the mixing chamber. In this modification, a mixing chamber 55 constituting a straight tubular transparent container is employed. This container is divided longitudinally by a central partition 56 so as to form two separate compartments 57 and 58. A shaft 59 which is similar to the shaft 13 of the principal embodiment is provided at its bottom portion with a bifurcated arm 60 adapted to grip the partition 56 and turn the container 55 upon rotary movement of the cover 15. The container 55 is supported by a base member 61 and a hard gasket material 62. This gasket material 62 is provided with apertures 63 which serve as means for straining the coffee grinds. The gasket 62, as well as the base 61, is also provided with an opening corresponding with the opening 19 (Figure 7) for removing the grinds from the chamber. A valve 64 and a valve housing 65 correspond with the valve 54 and housing 53, respectively. A projecting member 66 extending from the housing 67 which is otherwise similar to the housing 6 supports a spring 68 which engages with the underside of the valve housing 65 for supporting the base 61 and providing the desired degree of pressure between the gasket 62 and the container 55. An outlet 69 formed in the base 61 communicates with the interior of the chamber 55, and a manually operated valve 70 closes the outlet 69 with the aid of a spring 71. The remaining portion of the modification is similar in all respects to the principal embodiment hereinbefore described.

As thus shown and described, it is believed apparent that I have provided a novel and useful appliance for quickly preparing hot beverages, and while I have thus shown and described a principal embodiment of my invention, and one modification thereof, it is to be understood that I contemplate such other modifications as appear obviously within the spirit of the invention and the scope of the appended claims.

Having thus described my invention what I claim and desire to protect by Letter Patent, is:

1. An appliance for preparing hot beverage comprising a mixing container, a hopper positioned above the mixing container for retaining a quantity of solid particles, a measuring container interposed between the hopper and the mixing container for delivery of a metered quantity of particles from said hopper to said mixing container, a liquid container and a heating element for heating the liquid in said container, a conduit forming a communication betwen the liquid container and the mixing container for conducting liquid from said liquid container to said mixing container, said mixing container having a releasable outlet at its lowermost portion, said mixing container having an opening at the bottom thereof through which solid particles may be ejected, and a rotatable wall in the mixing container and forming a dividing partition between said outlet and said opening and forming two compartments in said mixing container each of which compartments alternately communicates with said outlet and said opening by rotation of said wall within said mixing container.

2. An appliance for preparing hot beverage comprising a mixing container, a hopper positioned above the mixing container for retaining a quantity of solid particles, a measuring container interposed between the hopper and the mixing container, a gate interposed between the measuring container and the mixing container for controlling the admission of a metered quantity of particles from the measuring container to said mixing container, a liquid container and a heating element for heating the liquid in said container, a fluid conduit forming a communication between the liquid container and the mixing container for conducting liquid from said liquid container to said mixing container, said mixing container having a releasable outlet at its lowermost portion, and said mixing container having an opening at the bottom thereof through which solid particles may be ejected, and a rotatable wall in the mixing container and forming a dividing partition between said outlet and said opening, and forming two compartments in said mixing container each of which compartments alternately communicates with said outlet and said opening by rotation of said wall within said mixing container.

3. An appliance for preparing hot beverage comprising a mixing container, a hopper positioned above the mixing container and communicating therewith for retaining a quantity of solid particles, a measuring container interposed between the hopper and the mixing container, said hopper having an opening in the bottom portion thereof whereby axial turning movement of the hopper positions a measured quantity of the solid particles in receptive position above said mixing container, and turning movement of the measuring container relative to said mixing container discharges the measured quantity of particles into said mixing container, a liquid container and a heating element for heating the liquid in said container, a conduit forming a communication between the liquid container and the mixing container for conducting liquid from said liquid container to said mixing container, said mixing container having a releasable outlet at its lowermost portion, and said mixing container having an opening at the bottom thereof through which solid particles may be ejected, and a rotatable wall in the mixing chamber forming a dividing partition between said outlet and said opening and forming two compartments in said mixing container each of which compartments alternately communicates with said outlet and said opening by rotation of said wall within said mixing container.

4. An appliance for preparing hot beverage comprising a mixing container, a hopper positioned above the mixing container for retaining a quantity of solid particles, a measuring container interposed between the hopper and the mixing container, said hopper having an opening in the bottom portion thereof whereby relative axial turning movement of the hopper to said mixing container positions a measured quantity of the solid particles in receptive position above said mixing container and relative movement of said measuring container to said mixing container delivers the measured quantity of particles to said mixing container, a rotatable wall dividing the mixing container into two separate compartments, a strainer located at the base of one of the compartments, the other of said compartments having an opening through the base thereof for the disposal of residue solid particles, said mixing container having a releasable outlet at its lowermost portion communicating with one of the compartments while the disposal opening communicates with the other of the compartments, said wall being rotatable upon axial turning movement of the hopper, a liquid container and a heating element for heating the liquid in said container, and a conduit forming a communication between the liquid container and the mixing container for conducting liquid container to said mixing container.

5. An appliance for preparing hot beverage comprising a mixing container, a hopper positioned above the mixing container for retaining a quantity of solid particles, a measuring container interposed between the hopper and the mixing container, said hopper having an opening in the bottom portion thereof whereby axial turning movement of the hopper relative to said measuring container and said mixing container positions a measured quantity of the solid particles in receptive position above said mixing container, said measuring container and said mixing container having openings which when aligned by rotation of said measuring container will dispense the measured particles into said mixing container, a wall dividing the mixing container into two separate compartments, a strainer located at the base of one of the compartments, the other of said compartments having an opening through the base thereof for the disposal of residue solid particles, said mixing container having a releasable outlet at its lowermost portion, said movable wall in the mixing container forming a dividing partition between said outlet and said opening, said wall being rotatable relative to said mixing container upon axial turning movement of the hopper, said dividing wall having resilient edges for engaging the interior wall of the mixing container for wiping the residue solid particles from one compartment to the other during its relative turning movement, a liquid container and a heating element for heating the liquid in said container, and a conduit forming a communication between the liquid container and mixing container for conducting liquid from said liquid container to said mixing container.

6. An appliance for preparing hot beverage comprising a mixing container having an opening in the top thereof, a hopper positioned above the mixing container for retaining a quantity of solid particles, a measuring container interposed between the hopper and the mixing container, said hopper having an opening in the bottom portion thereof whereby axial turning movement of the hopper relative to said mixing container positions a measured quantity of the solid particles in receptive position above said mixing container, means for rotating said measuring containers relative to said mixing container for dispensing the measured particles in said measuring container to said mixing container, a liquid container and a heating element for heating the liquid in said container, a conduit forming a communication between the liquid container and the mixing container for conducting liquid from said liquid container to said mixing chamber, said mixing container having a releasable outlet at its lowermost portion, and said mixing container having an opening at the bottom thereof through which solid particles may be ejected, a rotatable wall in the mixing chamber and forming a dividing partition between said outlet and said opening, and an electrical contact engageable upon the turning movement of the hopper for initiating operation of said heating element.

7. An appliance for preparing hot beverage comprising a mixing container, a hopper positioned above the mixing container for retaining a quantity of solid particles, a measuring container interposed between the hopper and the mixing container rotatably mounted relative to said mixing container, said hopper having an opening in the bottom portion thereof whereby initial axial turning movement of the hopper relative to said mixing container positions a measured quantity of the solid particles through the hopper opening in receptive position above said mixing container, said measuring container having an opening in its lower wall through which particles pass to said mixing container when said measuring container is rotated, a liquid container and a heating element for heating the liquid in said container, a conduit forming a communication between the liquid container and the mixing container for conducting liquid from said liquid container to said mixing container, said mixing container having a releasable outlet at its lowermost portion, and said mixing container having an opening at the bottom thereof through which solid particles may be ejected, a rotatable wall in the mixing chamber forming a dividing partition between said outlet and said opening, an electrical contact engageable upon the turning movement of the hopper for initiating operation of said heating element, and a bimetal thermostat associated with the liquid container for disengaging the electrical contact.

8. An appliance for preparing hot beverage comprising a mixing container, a hopper positioned above the mixing container for retaining a quantity of solid particles, a measuring container interposed between the hopper and the mixing container, said parts being so constructed and arranged that relative rotation of said metering container relative to said hopper and said mixing container will discharge a metered quantity of particles from said hopper to said mixing container, a liquid container and a heating element for heating the liquid in said container, an entrance conduit through which liquid may enter said liquid container, a valve associated with the entrance conduit to prevent backflow of liquid therethrough, a conduit forming a communication between the liquid container and the mixing container for conducting liquid from said liquid container to said mixing container, a valve associated with said conduit to prevent backflow of liquid from the mixing container to the liquid container, said mixing container having a releasable outlet at its lowermost portion, and said mixing container having an opening at the bottom thereof through which solid particles may be ejected, and a rotatable wall in the mixing chamber forming a dividing partition between said outlet and said opening.

ARTHUR A. LOCKE.

REFERENCES CITED

The following references are of record in the file of this patent:

UNITED STATES PATENTS

| Number | Name | Date |
|---|---|---|
| Re. 22,879 | Peters et al. | May 13, 1947 |
| 1,470,584 | Kreutz | Oct. 9, 1923 |
| 1,736,460 | Pistoni et al. | Nov. 19, 1929 |
| 1,805,159 | Bauer et al. | May 12, 1931 |
| 1,822,433 | Brand | Sept. 8, 1931 |
| 1,903,519 | Snider | Apr. 11, 1933 |
| 2,012,645 | Thomas | Aug. 27, 1935 |
| 2,014,325 | Grilli | Sept. 10, 1935 |
| 2,114,063 | Stoner | Apr. 12, 1938 |
| 2,149,270 | Burgess | Mar. 7, 1939 |
| 2,392,452 | Baumann | Jan. 8, 1946 |

FOREIGN PATENTS

| Number | Country | Date |
|---|---|---|
| 644,253 | Germany | Apr. 27, 1937 |
| 289,689 | Great Britain | May 3, 1928 |